US 9,329,858 B2

(12) United States Patent
Nicol et al.

(10) Patent No.: US 9,329,858 B2
(45) Date of Patent: May 3, 2016

(54) MANAGING ACCESS TO RESOURCE VERSIONS IN SHARED COMPUTING ENVIRONMENTS

(71) Applicant: LinkedIn Corporation, Mountain View, CA (US)

(72) Inventors: John W. Nicol, San Jose, CA (US); Dwight E. Holman, San Jose, CA (US); Soumya Mahadevan, Mountain View, CA (US); Jens O. Pillgram-Larsen, Pleasanton, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/501,970

(22) Filed: Sep. 30, 2014

(65) Prior Publication Data
US 2016/0092208 A1  Mar. 31, 2016

(51) Int. Cl.
G06F 9/44 (2006.01)
H04L 12/923 (2013.01)
H04L 29/06 (2006.01)
H04L 12/803 (2013.01)
G06F 11/36 (2006.01)

(52) U.S. Cl.
CPC .............. *G06F 8/71* (2013.01); *G06F 11/3688* (2013.01); *H04L 47/125* (2013.01); *H04L 47/762* (2013.01); *H04L 65/403* (2013.01)

(58) Field of Classification Search
USPC .................................. 717/105–109, 120–122
IPC ..................................... G06F 8/65,8/71, 8/3688
See application file for complete search history.

(56) References Cited

U.S. PATENT DOCUMENTS

| | | | | |
|---|---|---|---|---|
| 7,334,216 B2* | 2/2008 | Molina-Moreno | ....... | G06F 8/35 717/105 |
| 7,454,745 B2* | 11/2008 | Aridor | ...................... | G06F 8/71 707/999.202 |
| 7,487,493 B1* | 2/2009 | Faulkner | .................... | G06F 8/31 717/105 |
| 7,543,269 B2* | 6/2009 | Krueger | .................... | G06F 8/61 717/102 |
| 7,562,346 B2* | 7/2009 | Jhanwar | .................... | G06F 8/71 717/100 |
| 7,627,853 B2* | 12/2009 | Ibert | ....................... | G06F 9/542 717/104 |
| 7,631,291 B2* | 12/2009 | Shukla | ...................... | G06F 8/10 717/107 |
| 7,735,060 B2* | 6/2010 | Harvey | ...................... | G06F 8/61 714/38.14 |
| 7,735,062 B2* | 6/2010 | de Seabra e Melo | . | G06F 9/4443 707/616 |

(Continued)

OTHER PUBLICATIONS

Le et al, "Patch Verification via Multiversion Interprocedural Control Flow Graphs", ACM, pp. 1047-1058, 2014.*

(Continued)

*Primary Examiner* — Anil Khatri
(74) *Attorney, Agent, or Firm* — Park, Vaughan, Fleming & Dowler LLP; Chia-Hsin Suen

(57) ABSTRACT

The disclosed embodiments provide a system that manages access to resource versions in a shared computing environment. Routing data including locations of the resource versions is used to route a request to a resource version in the shared computing environment. For an application that is implemented by a set of resources, the routing data and the request is used to execute the application using an alternative version of a resource that is under test and default versions of other resources that are not under test.

17 Claims, 4 Drawing Sheets

(56) References Cited

U.S. PATENT DOCUMENTS

| | | | | |
|---|---|---|---|---|
| 7,793,260 B2 * | 9/2010 | Fields | | G06F 8/38 715/744 |
| 8,042,094 B2 * | 10/2011 | Napoli | | G06F 3/14 717/108 |
| 8,225,282 B1 * | 7/2012 | Massoudi | | G06F 8/34 717/104 |
| 8,276,121 B2 * | 9/2012 | Miller | | G06F 8/71 717/120 |
| 8,458,661 B2 * | 6/2013 | Gu | | G06F 8/71 717/101 |
| 8,667,465 B2 * | 3/2014 | Poole | | G06F 8/71 717/120 |
| 8,671,392 B2 * | 3/2014 | Jahr | | G06F 8/60 717/101 |
| 9,009,665 B2 * | 4/2015 | Supplisson | | G06F 11/362 717/121 |

OTHER PUBLICATIONS

Towend et al, "Building Dependable Software for Critical Applications: Multi-Version Software versus One Good Version", IEEE, pp. 103-110, 2001.*

Nguyen et al, "Object Oriented, Structural Software Configuration Management", ACM, 35-36, 2004.*

Piccioni et al, "An IDE-based, integrated solution to Schema Evolution of Object-Oriented Software" IEEE, pp. 650-654, 2009.*

Singh, "Metrics for Measuring the Quality of Object-Oriented Software", ACM SIGSOFT Software Engineering Notes, vol. 38 No. 5, pp. 1-5, 2013.*

Galster, "Describing Variability in Service-oriented Software Product Lines ", ACM, pp. 344-350, 2010.*

* cited by examiner

MANAGING ACCESS TO RESOURCE VERSIONS IN SHARED COMPUTING ENVIRONMENTS

BACKGROUND

1. Field

The disclosed embodiments relate to techniques for managing access to resources. More specifically, the disclosed embodiments relate to techniques for managing access to resource versions in shared computing environments.

2. Related Art

Service-oriented architectures (SOAs) utilize multiple self-contained, reusable services to implement the functionality of large and/or complex applications. For example, a large enterprise system and/or website may include hundreds of services, each provided by a distinct piece of software that performs one or more specific tasks for users of the enterprise system and/or website. During use of a SOA-based application, multiple service calls may be made to services in the application. Within the application, services may use well-defined interfaces and/or data formats to communicate with one another and interoperate. The interfaces and/or data formats may abstract away from the underlying implementations of the services and allow services in the same application to utilize different development technologies and/or platforms. For example, services in the same SOA-based application may be developed using different programming languages and/or execute within different execution environments and/or platforms.

During development or testing of a newer version of a service in a SOA implementation, a developer may deploy the newer version of the service on his/her local machine. Other services on which the service depends may also be deployed on the same local machine to enable communication among the services and testing of the service's functionality. Alternatively, the other services may run in a remote staging environment along with an older (e.g., current) version of the service, and the newer version may be tested by generating requests that are redirected from the older version in the staging environment to the newer version executing on the local machine. Dependencies of the newer version may be satisfied by sending requests to other services in the staging environment. In other words, the newer version on the local machine may be substituted for the older version in the staging environment to test the newer version and offload resource usage by other services from the local machine to the staging environment.

However, deployment of test services on local machines that are external to the execution environments of other services in the same SOA implementation may be associated with a number of complexities and/or drawbacks. First, the physical distance between a local machine and a remote execution environment may increase the latency associated with servicing requests from the local machine and result in timeouts. Second, differences in network settings and/or configurations (e.g., firewalls, Virtual Private Networks (VPNs), wireless networks, etc.) between the local machine and remote execution environment may produce network errors during communication between test services on the local machine and services in the remote execution environment. Third, rerouting of requests from services in the remote execution environment to test services on the local machine may be performed by maintaining a mapping of the services on the remote execution environment to test versions of the services on the local machine and propagating the mapping to the services. Such dynamic updating and propagation of the mapping within the remote execution environment may significantly increase the complexity of the SOA implementation, while misconfiguration of the mapping may cause routing errors in the SOA implementation. Finally, deployment of a service to a local machine may be associated with increased security risk because the service cannot be effectively monitored and/or audited using security mechanisms available in the remote execution environment.

Consequently, development of services in SOAs may be facilitated by mechanisms for simplifying the use of development and/or test services with existing services in the SOAs.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
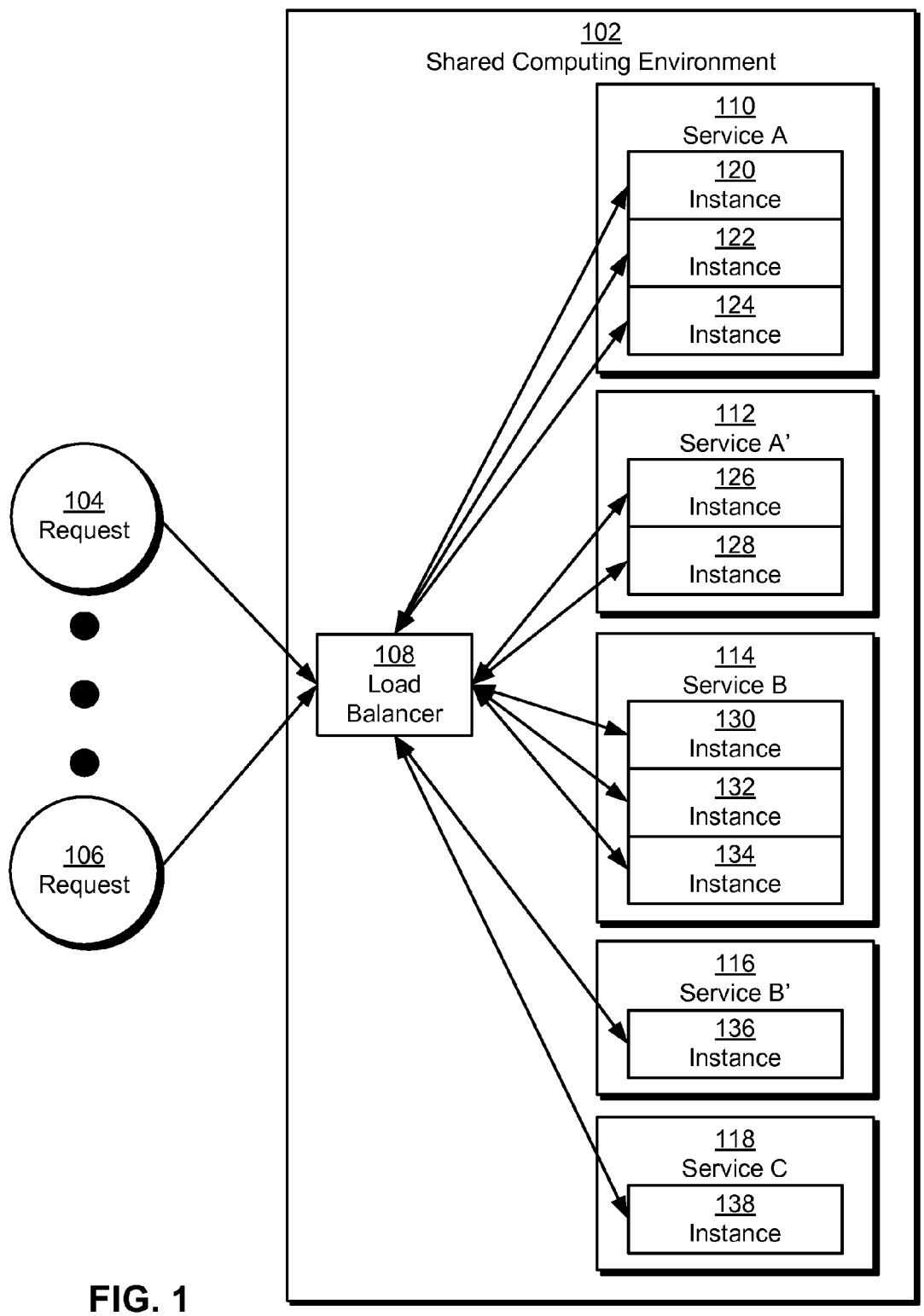
FIG. 1 shows an exemplary shared computing environment in accordance with the disclosed embodiments.

The disclosed embodiments provide a method and system for managing access to a resource, such as a service deployed in a service-oriented architecture (SOA) implementation. As shown in FIG. 1, a number of services (e.g., service A 110, service A' 112, service B 114, service B' 116, service C 118) may be deployed in a shared computing environment 102. For example, the services may implement the functionality of an application that is hosted in a cloud computing system, such as a web application.

To use the application, users may transmit requests 104-106 for the services to shared computing environment 102, and the services may process requests 104-106 to perform tasks for the users. For example, each service may provide one or more features of a SOA-based web application. Within the web application, the services may use well-defined interfaces and/or data formats to communicate with one another and interoperate. The interfaces and/or data formats may abstract away from the underlying implementations of the services, thus allowing services in the same application to utilize different development technologies and/or platforms. As a result, each service in the web application may be developed, updated, and/or deployed independently of other services in the web application.

More specifically, multiple versions of a service may be deployed in shared computing environment 102 during development and/or testing of the service. For example, services A 110, B 114, and C 118 may provide a complete implementation of the application in shared computing environment 102. As a result, services A 110, B 114, and C 118 may represent default versions of the services in shared computing environment 102. On the other hand, service A' 112 may be a newer and/or alternative version of service A 110, and service B' 116 may be a newer and/or alternative version of service B 114.

Services A' 112 and B' 116 may be deployed in shared computing environment 102 during development and/or testing of A' 112 and B' 116. As a result, shared computing environment 102 may be a testing environment and/or staging environment for the application. Within the testing and/or staging environment, services A 110 and B 114 may be default versions of the services, while services A' 112 and B' 116 may be newer versions of A 110 and B 114 that can be used in lieu of A 110 and B 114 for testing and/or comparison purposes.

In addition, one or more instances 120-138 of each service may be deployed in shared computing environment 102. For example, service A 110 may have three instances 120-124 running in shared computing environment 102, and service A' 112 may have two instances 126-128 running in shared computing environment 102. Three instances 130-134 of service B 114 may be deployed to shared computing environment 102, while only one instance 136 of service B' 116 may be deployed to shared computing environment 102. Finally, only one instance 138 of service C 118 may run in shared computing environment 102.

Variations in the numbers of instances 120-138 of services in shared computing environment 102 may be based on usage of the services, reliability and/or availability requirements for the services, and/or testing requirements for the services. For example, service A 110 and service B 114 may have more instances 120-124 and 130-134 than service C 118 because service A 110 and service B 114 may be configured to handle a larger number of requests (e.g., requests 104-106) than service C 118. Service A' 112 may have two instances 126-128 running in shared computing environment 102 to test scaling of service A' 112, while service B' 116 may only have one instance 136 running in shared computing environment 102 because the testing requirements for service B' 116 do not require multiple instances of the service.

To balance the workload among multiple instances of a service, a load balancer 108 may route requests for the service to different instances of the service based on a load-balancing technique. For example, load balancer 108 may direct requests for service A 110 to different instances 120-124 of service A 110 based on a round-robin technique, the number of connections associated with each instance, a source Internet Protocol (IP) address of each request, user sessions associated with instances 120-124, and/or other factors.

As mentioned above, services A' 112 and B' 116 may be deployed to shared computing environment 102 as alternative versions of services A 110 and B 114. The development, deployment, and/or execution of services A' 112 and B' 116 may be conduced by the same developer or team, or by separate developers and/or teams. In other words, different subsets of services in shared computing environment 102 may be used by different developers and/or teams for different purposes. For example, the functionality of an application that is implemented by services A 110, B 114, and C 118 may be invoked by making a series of requests (e.g., requests 104-106) to services A 110, B 114, and C 118; A' 112, B 114, and C 118; A 110, B' 114, and C 118; or A' 112, B' 116, and C 118.

To enable testing of individual services in the application, default versions of one or more services (e.g., services A 110, B 114, and C 118) may be used to satisfy the dependencies of a newer and/or alternative version of a service (e.g. services A' 112 and B' 116) under test. A default version of a service may thus be shared by multiple test versions of other services, thereby reducing resource usage over that of a testing environment in which all of the dependencies of a service under test are duplicated for dedicated use by the service under test. Such deployment and substitution of service versions in the same shared computing environment 102 may further avert latency, network, compatibility, security, and/or other issues associated with deploying a test version of a service on a host outside of shared computing environment 102 and routing requests from shared computing environment 102 to the test version.

To enable substitution of one version of a service for another in processing a request, load balancer 108 may route the request to a given version of the service based on control information in the request. For example, load balancer 108 may obtain a version identifier for an alternative and/or non-default version of a service from control information in a request for the service and use the version identifier to route the request to the alternative version. If the request does not contain a version identifier, load balancer 108 may route the request to a default version of the service. The operation of load balancer 108 is described in further detail below with respect to FIG. 2.

Figure 2:
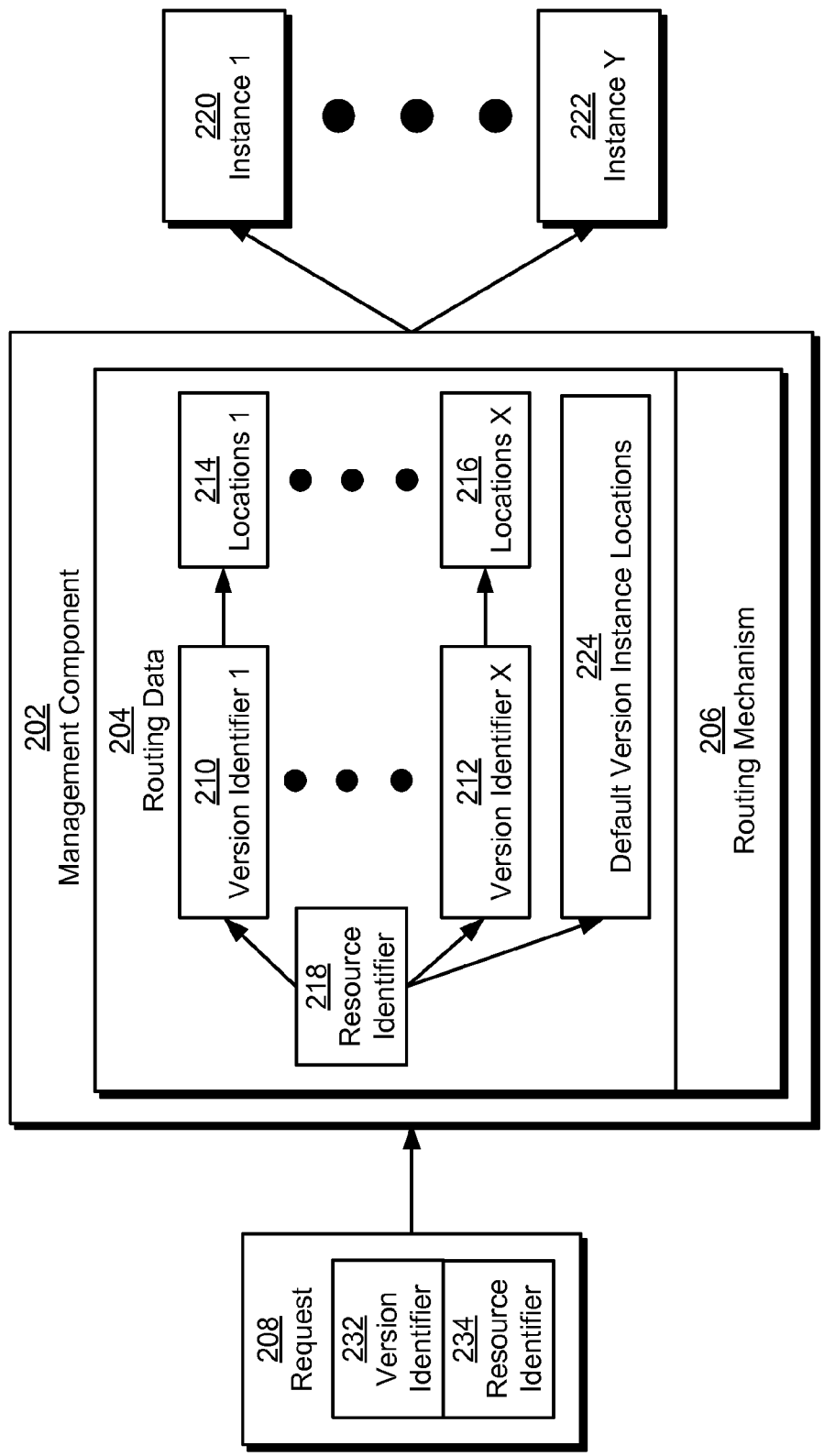
FIG. 2 shows a system for managing access to a resource in accordance with the disclosed embodiments.

FIG. 2 shows a system for managing access to a resource in accordance with the disclosed embodiments. As shown in FIG. 1, a management component 202 may manage access to a set of instances (e.g., instance 1 220, instance y 222) of one or more resources. For example, management component 202 may be a load balancer that routes requests for services to different instances of the service in a shared computing environment, such as shared computing environment 102 of FIG. 1.

Resources managed by management component 202 may additionally include data stores, data schemas, configurations, and/or other resources for executing an application in the shared computing environment. For example, management component 202 may be used to substitute an alternative version of a data store (e.g., database, filesystem, disk drive, etc.), data schema, configuration information for the application, and/or other resource used in the application for a default version of the resource.

To enable routing of a request 208 to a given version and/or instance of a resource, management component 202 may be configured with and/or receive routing data 204 for resources in the shared computing environment. Routing data 204 may include a resource identifier 218 for a given resource in the shared computing environment. For example, resource identifier 218 for a service in a web application may include a Uniform Resource Identifier (URI) for the service that can be included in a HyperText Transfer Protocol (HTTP) request for the service.

Routing data 204 may also include version identifiers (e.g., version identifier 1 210, version identifier x 212) associated with resource identifier 218. Each version identifier may represent an alternative version of the resource in the shared computing environment. The version identifier may also include one or more attributes associated with the alternative version. For example, the version identifier for an alternative version of a service may identify a user associated with the alternative version (e.g., a developer of the alternative version), a machine on which the alternative version executes, and/or a name of the alternative version. The version identifiers may then be mapped to one or more locations (e.g., locations 1 214, locations x 216) of one or more instances of the corresponding alternative versions. For example, a version identifier for an alternative version of a service may be mapped to one or more IP addresses of instances of the alternative version.

After an alternative version of a resource is added to the shared computing environment, routing data 204 for the alternative version may be provided to management component 202. For example, routing data 204 may be updated with the version identifier and one or more instances of a test version of a service after the instance(s) are deployed to a shared execution environment. Routing data 204 may then be used by management component 202 to route requests to the alternative version instead of the default version of the resource in the shared computing environment.

In particular, management component 202 may receive a request 208 for the resource that includes a version identifier 232 for the alternative version of the resource and a resource identifier 234 for the resource. Management component 202 may match resource identifier 234 to resource identifier 218 in routing data 204 and version identifier 232 to a version identifier (e.g., version identifier 1 210, version identifier x 212) associated with resource identifier 218 in routing data 204. Management component 202 may use one or more mappings in routing data 204 to identify one or more locations (e.g., locations 1 214, locations x 216) of one or more instances the alternative version and use a routing mechanism 206 to route the request to one of the instances of the alternative version.

Alternatively, if management component 202 receives a request that specifies resource identifier 234 but lacks a version identifier, management component 202 may match resource identifier 234 to resource identifier 218 in routing data 204 and obtain a set of default version instance locations 224 associated with resource identifier 218 from routing data 204. Management component 202 may then use routing mechanism 206 to route the request to an instance from default version instances 224.

For example, a load balancer may be configured using the following configuration information:
    listen profile-tomcat-private-http 127.0.0.1:12224
    option httpchk GET /profile/admin
    server s1-default1    s1-default1.stg.linkedin.com:12224
        check
    server s1-default2    s1-default2.stg.linkedin.com:12224
        check
    if LI-user header is set then
    select server matching s1-<LI-user>
The configuration information may declare a listening service for "/profile" traffic named "profile-tomcat-private-http" and perform a health check of servers for the "/profile" resource. Next, the configuration information declares two instances of a default version of a service, which are named "s1-default" and "s2-default." The configuration information may then include a check for a header with a variable named "LI-user" and specify the selection of a server with a name containing the value of the variable. As a result, the configuration information may include routing data (e.g., routing data 204) that can be used to route requests for "/profile" to either of the default instances or to one or more instances of an alternative version of the service.

The exemplary configuration information above may then be used to route a request with the following HTTP header:
    GET /profile HTTP/1.1
    User-Agent: curl/7.19.7 (x86_64-redhat-linux-gnu) libcurl/7.19.7
    NSS/3.14.3.0 zlib/1.2.3 libidn/1.18 libssh2/1.4.2
    Host: linkedin-ei.com
    LI-user=dholman
For example, the configuration information may cause the load balancer to extract the value of "dholman" from the header and route the request to a server with a name that contains "s1-dholman." The server may be an instance of an alternative version of the service that is represented by the "dholman" version identifier, such as an instance named "s1-dholman-001" or "s1-dholman-002." Conversely, if a request omits a field for "LI-user," the load balancer may route the request to either "s1-default1" or "s1-default2."

Figure 3:
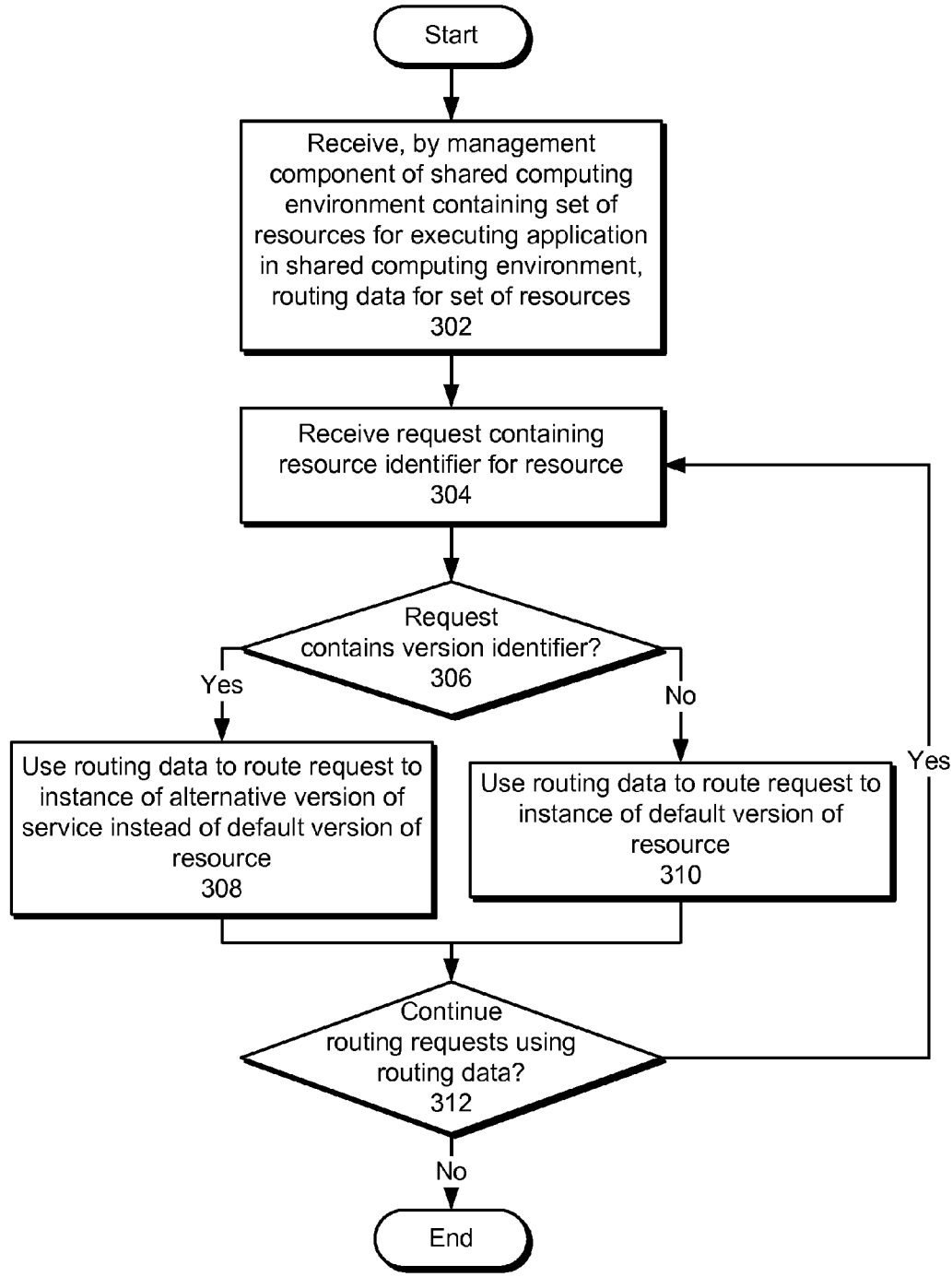
FIG. 3 shows a flowchart illustrating the process of managing access to a resource in accordance with the disclosed embodiments.

FIG. 3 shows a flowchart illustrating the process of managing access to a resource in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a management component of a shared computing environment containing a set of resources for executing an application in the shared computing environment receives routing data for the set of resources (operation 302). For example, the managing component may be a load balancer that uses the routing data to route requests to instances and/or versions of resources in the shared computing environment. The routing data may include mappings from a version identifier for an alternative version of a resource to one or more locations of one or more instances of the alternative version in the shared computing environment. Illustratively, the version identifier may be associated with a user, the alternative version, and/or a machine. For example, the version identifier may include an identifier for a developer of the alternative version, the name of the alternative version, and/or the name of a machine on which the alternative version executes.

In addition, the routing data may be received by the management component after the alternative version is added to the shared computing environment. For example, the routing data may be added to configuration information for a load balancer in the shared computing environment after an alternative version of a service used to execute the application is deployed to the shared computing environment during development and/or testing of the alternative version. In turn, the alternative version may be substituted for a default version of the service during such development and/or testing.

Next, a request containing a resource identifier for the resource is received (operation 304). For example, the request may be an HTTP request that includes a URI of a service deployed in the shared computing environment. The request is processed based on a presence of the version identifier in the request (operation 306). For example, the version identifier may be included in a header, cookie, and/or other control information of an HTTP request for the service.

If the request includes the version identifier, the routing data is used to route the request to an instance of the alternative version of the resource instead of the default version of the resource (operation 308). For example, the version identifier from the request and one or more mappings in the routing data may be used to identify one or more instances of the alternative version of the resource, and a load-balancing technique (e.g., round robin, number of connections, IP address, user session) may be used to route the request to one of the instances.

As a result, the routing data and the request may be used to execute the application using the alternative version of the resource and default versions of other resources from the set of resources instead of the default version of the resource and the default versions of the other resources. For example, testing of the alternative version may be enabled by satisfying one or more dependencies of the alternative version using default versions of the other resources in the shared computing environment. Alternatively, the alternative version may be substituted for the default version of the resource in a production environment during, for example, A/B testing of the application and/or other execution of the application using the alternative version in a production setting.

If the request omits a field for the version identifier (e.g., the request does not specify a version identifier), the routing data is used to route the request to an instance of a default version of the resource (operation 310). For example, the routing data may be used to identify one or more instances of a default version of a service identified in the request, and a load-balancing technique may be used to route the request to one of the instances.

Routing of requests using the routing data may continue (operation 312). For example, requests may continue to be routed using the routing data during deployment of the alternative version of the resource in the shared computing environment. If requests are to be routed using the routing data, each request is routed to an instance of the alternative version or an instance of the default version of the resource based on the presence or absence of a version identifier in the request (operations 304-310). Requests may be routed to instances of the alternative version to enable testing and/or other execution of the alternative version in the application, while requests may be routed to instances the default version during testing of other resources in the application and/or other types of execution of the application. Routing of requests to the resource may continue until the alternative version of the resource is no longer deployed in the shared computing environment, until testing is no longer desired, or until some other condition is satisfied.

Figure 4:
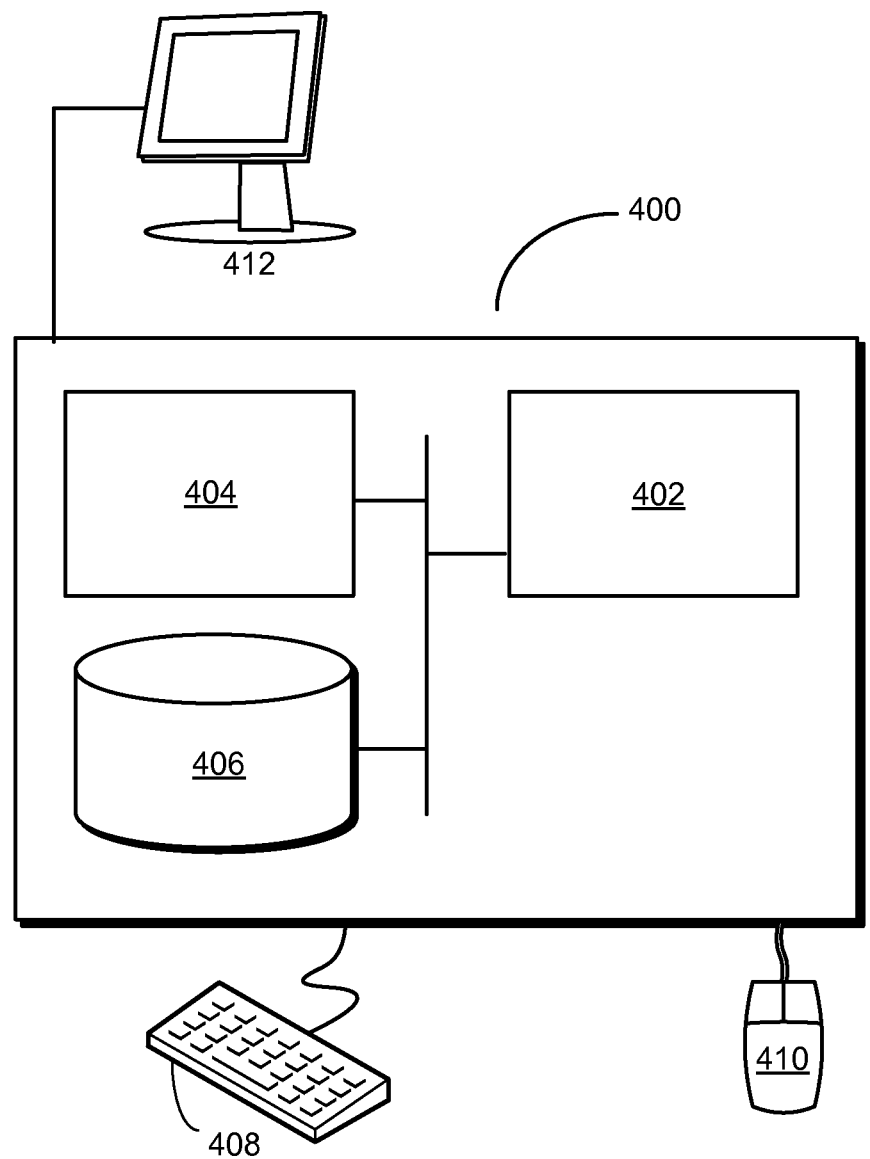
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for managing access to a resource. The system may include a management component of a shared computing environment that contains a set of resources. The management component may receive routing data for the set of resources. The routing data may include locations of one or more instances of an alternative version of a resource included in the set of resources and a version identifier for the alternative version that is mapped to the one or more locations. Upon receiving a request for the resource that includes the version identifier and a resource identifier for the resource, the management component may use the routing data to route the request to an instance of the alternative version instead of a default version of the resource. For example, the management component may be a load balancer that uses a load-balancing technique to route the request to an instance of an alternative version of a service in the shared computing environment. On the other hand, if the resource includes the resource identifier and omits a field for the version identifier, the management component may use the routing data to route the request to an instance of the default version of the resource.

In addition, one or more components of computer system 400 may be remotely located and connected to the other components over a network. Portions of the present embodiments (e.g., management component, resources, instances, routing data, etc.) may also be located on different nodes of a distributed system that implements the embodiments. For example, the present embodiments may be implemented using a cloud computing system that enables substitution of alternative versions of resources for default versions of resources for executing an application in the cloud computing system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing access to a resource, comprising:

receiving, by a management component of a shared computing environment comprising a set of resources for executing an application in the shared computing environment, routing data for the set of resources, wherein the set of resources comprises services that implement a functionality of the application, and wherein the routing data comprises:

a resource identifier for a resource included in the set of resources;
an instance location of a default version of the resource and one or more locations of one or more instances of an alternative version of the resource; and
a version identifier for the alternative version that is mapped to the one or more locations; and
upon receiving, by the management component, a first request that includes the version identifier and the resource identifier for the resource, using the routing data to route the first request from the management component to an instance of the alternative version included in the one or more instances of the alternative version instead of the default version of the resource;
wherein the alternative version of the resource is added to the shared computing environment during at least one of:
  development of the alternative version; and
  testing of the alternative version.

2. The method of claim 1, further comprising:
upon receiving, by the management component, a second request that omits a field for the version identifier and includes the resource identifier, using the routing data to route the second request from the management component to an instance of the default version of the resource.

3. The method of claim 1, wherein the routing data is received by the management component after the alternative version of the resource is added to the shared computing environment.

4. The method of claim 1, wherein the version identifier is associated with at least one of:
  a user;
  the alternative version; and
  a machine.

5. The method of claim 1, wherein the version identifier is included in at least one of:
  a header of the request; and
  a cookie in the request.

6. The method of claim 1, wherein the resource is at least one of:
  a service;
  a configuration;
  a data store; and
  a data schema.

7. The method of claim 1, wherein the routing data and the first request are used to execute the application using the alternative version of the resource and default versions of other resources from the set of resources instead of the default version of the resource and the default versions of the other resources.

8. The method of claim 1, wherein the management component comprises a load balancer that uses a load-balancing technique to route the first request to the instance of the alternative version from the one or more instances of the alternative version.

9. An apparatus, comprising:
one or more processors; and
memory storing instructions that, when executed by the one or more processors, cause the apparatus to:
  receive, by a management component of a shared computing environment comprising a set of resources for executing an application in the shared computing environment, routing data for the set of resources, wherein the set of resources comprises services that implement a functionality of the application, and wherein the routing data comprises:
    a resource identifier for a resource included in the set of resources;
    an instant location of a default version of the resource and one or more locations of one or more instances of an alternative version of the resource; and
    a version identifier for the alternative version that is mapped to the one or more locations; and
  upon receiving, by the management component, a first request that includes the version identifier and the resource identifier for the resource, use the routing data to route the first request from the management component to an instance of the alternative version instead of the default version of the resource;
  wherein the alternative version of the resource is added to the shared computing environment during at least one of:
    development of the alternative version; and
    testing of the alternative version.

10. The apparatus of claim 9, wherein the memory further stores instructions that, when executed by the one or more processors, cause the apparatus to:
  upon receiving a second request that omits a field for the version identifier and includes the resource identifier, using the routing data to route the second request from the management component to an instance of the default version of the resource.

11. The apparatus of claim 9, wherein the routing data and the first request are used to execute the application using the alternative version of the resource and default versions of other resources from the set of resources instead of the default version of the resource and the default versions of the other resources.

12. The apparatus of claim 9, wherein the version identifier is associated with at least one of:
  a user;
  the alternative version; and
  a machine.

13. The apparatus of claim 9, wherein the resource is at least one of:
  a service;
  a configuration;
  a data store; and
  a data schema.

14. A system, comprising:
one or more processors; and
a management non-transitory computer readable medium comprising instructions that, when executed by the one or more processors, cause the system to:
  receive routing data for a set of resources for executing an application in the shared computing environment, wherein the set of resources comprises services that implement a functionality of the application, and wherein the routing data comprises:
    a resource identifier for a resource included in the set of resources;
    an instance location of a default version of the resource and one or more locations of one or more instances of an alternative version of the resource; and
    a version identifier for the alternative version that is mapped to the one or more locations; and
  upon receiving a first request that includes the version identifier and the resource identifier for the resource, using the routing data to route the first request to an instance of the alternative version among the one or more instances of the alternative version instead of the default version of the resource;

wherein the alternative version of the resource is added to the shared computing environment during at least one of:
development of the alternative version; and
testing of the alternative version.

15. The system of claim 14, wherein the management non-transitory computer-readable medium further comprises instructions that, when executed by the one or more processors, cause the system to:
upon receiving a second request that omits a field for the version identifier and includes the resource identifier, use the routing data to route the second request from the management component to an instance of the default version of the resource.

16. The system of claim 14, wherein the routing data and the first request are used to execute the application using the alternative version of the resource and default versions of other resources from the set of resources instead of the default version of the resource and the default versions of the other resources.

17. The system of claim 14, wherein a load-balancing technique is used to route the first request to the instance of the alternative version from the one or more instances of the alternative version.

* * * * *